United States Patent
Sakai et al.

(10) Patent No.: US 7,448,554 B2
(45) Date of Patent: Nov. 11, 2008

(54) CLEANING DEVICE FOR A VEHICULAR LAMP

(75) Inventors: Masaru Sakai, Shizuoka (JP); Masaaki Sato, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 300 days.

(21) Appl. No.: 11/446,068

(22) Filed: Jun. 2, 2006

(65) Prior Publication Data

US 2006/0273139 A1 Dec. 7, 2006

(30) Foreign Application Priority Data

Jun. 3, 2005 (JP) .............................. 2005-164064

(51) Int. Cl.
*B05B 1/10* (2006.01)
*B05B 1/32* (2006.01)
*B05B 1/28* (2006.01)
*B05B 1/00* (2006.01)

(52) U.S. Cl. ................. 239/284.2; 239/284.1; 239/451; 239/455; 239/456; 239/458; 239/288; 239/288.5; 239/600

(58) Field of Classification Search .............. 239/284.2, 239/284.1, 451, 455, 456, 458, 288–288.5, 239/600; 15/250.001–250.05
See application file for complete search history.

(56) References Cited

U.S. PATENT DOCUMENTS

| | | | | | |
|---|---|---|---|---|---|
| 4,829,965 A | * | 5/1989 | Gartner et al. | ............... | 123/470 |
| 5,242,114 A | * | 9/1993 | Camier et al. | ............ | 239/284.2 |
| 5,762,271 A | * | 6/1998 | Lind et al. | ................ | 239/284.2 |
| 6,152,385 A | * | 11/2000 | Nuber et al. | ............. | 239/284.2 |
| 6,769,630 B1 | * | 8/2004 | Leipziger | ................. | 239/284.1 |
| 6,793,153 B2 | * | 9/2004 | Hirose et al. | ............. | 239/284.1 |
| 6,854,666 B2 | * | 2/2005 | Jenkins | .................... | 239/284.2 |

FOREIGN PATENT DOCUMENTS

| | | | |
|---|---|---|---|
| DE | 4121316 A1 | * | 1/1992 |
| DE | 4130892 A1 | * | 3/1992 |
| DE | 4401744 | | 7/1994 |
| DE | 10-2004-032-002 | | 1/2006 |
| EP | 508853 A1 | * | 10/1992 |
| EP | 0622280 | | 11/1994 |
| EP | 1466796 | | 10/2004 |
| JP | 8-58532 | | 3/1996 |
| JP | 2002-347584 | | 12/2002 |

* cited by examiner

*Primary Examiner*—Len Tran
*Assistant Examiner*—Steven Cernoch
(74) *Attorney, Agent, or Firm*—William L. Androlia; H. Henry Koda

(57) ABSTRACT

A cleaning device for a vehicular lamp including a piston 3, which has a spray nozzle 5 and a nozzle cover 7 covering the spray nozzle, and a cylinder 2, which drives the piston into and out of an opening 91 formed in a vehicle body 9. The nozzle cover has a cylindrical shaft receiving portion 72 extending from the rear surface thereof and an engagement hole 73a provided at a position away from the shaft receiving portion. The distal end of the piston has an engagement shaft portion 82, which projects forward and fits with the shaft receiving portion of the nozzle cover, and an engagement tab 83, which engages with the engagement hole of the nozzle cover. The engagement shaft portion fits with the shaft receiving portion and the engagement tab engages with the engagement hole by moving the nozzle cover toward the distal end of the piston.

6 Claims, 4 Drawing Sheets

CLEANING DEVICE FOR A VEHICULAR LAMP

BACKGROUND OF THE INVENTION

1. Field of the Invention

The present invention relates to a cleaning device for a vehicular lamp and more particularly to a cleaning device for cleaning the font cover of a vehicular lamp.

2. Description of the Related Art

A cleaning device for a vehicular lamp is mounted in a vehicle such as an automobile and cleans dirt off the front cover (front cover lens) of a headlamp.

The cleaning device for a vehicular lamp substantially has a spray nozzle on the distal end of a piston that is driven in and out of (or retracted into and extended from) a cylinder. When a cleaning fluid (water) is supplied to the inside of the cylinder, the piston projects out of the cylinder by the fluid pressure and allows the cleaning fluid to be sprayed out from the spray nozzle toward the front cover of the vehicular lamp. When the supply of the cleaning fluid is stopped, the piston returns to the inside of the cylinder by a spring installed between the cylinder and the piston.

In this cleaning device, the spray nozzle at the distal end of the piston is moved out and then moved back into the vehicle body through the opening (hole) formed in, for instance, a bumper. When the spray nozzle is retracted from the opening into the vehicle body, the opening is not necessary, and leaving the opening uncovered worsens the overall appearance. Moreover, there is a risk of damage or the like. Airborne objects such as pebbles kicked up by a rear wheel of a vehicle in front would hit the spray nozzle or the like.

In the cleaning device for a vehicular lamp disclosed in Japanese Patent Application Laid-Open (Kokai) No. 2002-347584, the opening for the spray nozzle is covered by a nozzle cover that is mounted on the distal end of the piston when the spray nozzle is retracted from the opening into the vehicle body. This structure provides an improved overall appearance and eliminates the risk of airborne objects such as pebbles hitting the spray nozzle or the like via the opening.

In the above-described cleaning device, the nozzle cover is fixed to the piston by two screws. Accordingly, the problem is that additional effort is required for assembling the nozzle cover. Furthermore, the nozzle cover is attached to the piston with the distal end of the piston retracted from the opening into the vehicle body. Thus, the work space for such attachment is extremely small, and it is not easy to tighten the screws in such a small space.

Japanese Patent Application Laid-Open (Kokai) No. 8-58532 discloses another cleaning device for a vehicular lamp in which the nozzle cover is attached to the distal end of the piston via a ball and socket joint mechanism. In this cleaning device, the nozzle cover is attached to the distal end of the piston by simply pushing a part of the nozzle cover (that forms a part of the ball and socket joint) from the outside to the inside of the opening of a vehicle body and then joining a part of the nozzle cover to a part of the ball and socket joint that is provided on the distal end of the piston.

However, in this cleaning device of Japanese Patent Application Laid-Open (Kokai) No. 8-58532, the nozzle cover and the distal end of the piston are joined at only one point of the ball and socket joint mechanism, and such joining is made merely by fitting a ball and a socket. Accordingly, the problem is that when an external force is applied to the nozzle cover, the nozzle cover can easily be dislodged from the vehicle body.

BRIEF SUMMARY OF THE INVENTION

Accordingly, the object of the present invention is to provide a structure that facilitates the attachment work of a nozzle cover and reliably ensures that the attached nozzle cover is hardly dislodged.

The above object is accomplished by a unique structure of the present inveniton for a cleaning device for a vehicular lamp, in which the nozzle cover includes a shaft receiving portion, which has a substantially cylindrical shape and is formed so as to extend from the rear surface of the nozzle cover, and an engagement hole, which is provided at a position away from the shaft receiving portion; and the piston has at its distal end an engagement shaft portion, which projects forward and fits with the shaft receiving portion of the nozzle cover, and an engagement tab, which engages with the engagement hole of the nozzle cover; and in this structure, the engagement shaft portion of the piston fits with the shaft receiving portion of the nozzle cover and the engagement tab of the piston engages with the engagement hole of the nozzle cover by merely moving the nozzle cover toward the distal end of the piston.

Accordingly, in the cleaning device for a vehicular lamp of the present invention, the nozzle cover can be attached to the distal end of the piston by simply moving the nozzle cover toward the distal end of the piston; and once attached, the nozzle cover cannot be removed from the piston unless the engagement between the engagement tab of the piston and the engagement hole of the nozzle cover is deliberately released.

More specifically, the above object is accomplished by a unique structure of the present inveniton for a cleaning device for a vehicular lamp that is comprised of:

a piston provided at a distal end thereof with a spray nozzle that sprays a cleaning fluid and a nozzle cover that forwardly covers the spray nozzle, and a cylinder that drives the piston to extend and retract with respect to (or that drives the piston out of and back into) an opening formed in a vehicle body or the like (in a bumper, a front cover of a lamp, etc.); and in the present invention:

the nozzle cover has a shaft receiving portion with a substantially cylindrical shape that extends from the rear surface of the nozzle cover and an engagement hole which is provided at a position away from the shaft receiving portion, and the piston has at its distal end an engagement shaft portion that projects forward and is to fit with the shaft receiving portion of the nozzle cover and an engagement tab that is to engage with the engagement hole of the nozzle cover; and in this structure by moving the nozzle cover toward the distal end of the piston, the engagement shaft portion of the piston is brought to fit with the shaft receiving portion of the nozzle cover and the engagement tab of the piston is brought to engage with the engagement hole of the nozzle cover, so that the nozzle cover is securely attached to the distal end of the piston.

Accordingly, in the cleaning device of the present invention, the nozzle cover can be attached to the distal end of the piston by simply moving the nozzle cover toward the distal end of the piston. As a result, the workability for attaching the nozzle cover to the distal end of the piston is extremely good; and once the nozzle cover is attached to the distal end of the piston, the nozzle cover cannot be removed from the distal end of the piston unless the engagement between the engagement tab and the engagement hole is deliberately released, and the nozzle cover is not easily separated from the distal end of the piston.

Furthermore, in the cleaning device of the present invention, the nozzle cover has two engagement plate portions that extend in a direction substantially opposite from the shaft receiving portion, and in this nozzle cover,
the engagement plate portions are formed in a plate shape,
a plane direction of the engagement plate portions substantially faces along the axial direction of the piston, and
the engagement plate portions are formed with the engagement holes; and on the other hand,
the piston has two supporting portions that extend in a direction substantially opposite from the engagement shaft portion, and in this piston,
the supporting portions are formed in a plate shape,
a plane direction of the supporting portions substantially faces along the plane direction of the engagement plate portions of the nozzle cover, and
the supporting portions are respectively provided with the engagement tabs that project from the surfaces that face the engagement plate portions of the nozzle cover, and the engagement tab has:
an inclined surface that faces the nozzle cover and whose projection height gradually increases in a direction away from the nozzle cover, and
an engagement surface that is a surface opposite from the inclined surface and is substantially perpendicular with respect to an axial direction of the piston.

Accordingly, there are two engagement locations which are made by the engagement tabs and the engagement holes, further assuring the attachment state of the nozzle cover to the distal end of the piston. Furthermore, the engagement tabs and the engagement holes are easily engaged, but difficult to disengage.

Furthermore, in the piston of the cleaning device of the present invention, the engagement shaft portion and the supporting portions are made continuous by gently concave-curved surfaces.

Accordingly, a reaction force that is generated when bending the supporting portions of the piston to release the engagement tabs from the engagement holes is diffused by the concave-curved portions, and there is thus little risk of damage to the continuously-formed curved areas between the engagement shaft portion and the supporting portions of the piston, even if engagement and disengagement of the engagement tabs of the piston and the engagement holes of the nozzle cover is repeated.

In the cleaning device of the present invention, the nozzle cover is provided with reinforcement ribs that are of a plate shape and extend from the rear surface of the nozzle cover, and end portions of the engagement plate portions that project out of the shaft receiving portion of the nozzle cover are connected to the reinforcement ribs. Accordingly, each of the engagement plate portions is supported at its both ends by the shaft receiving portion and the reinforcement rib, and thus the engagement plate portions are not easily deflected; and as a result, the engagement tabs of the piston and the engagement holes of the engagement plate portions of the nozzle cover are not easily disengaged.

Furthermore, in the cleaning device of the present invention, the engagement shaft portion of the piston is provided on its outer peripheral surface with a retaining ridge that extends in the axial direction of the engagement shaft portion, and
the shaft receiving portion of the nozzle cover is formed with an engagement notch that extends in the axial direction of the shaft receiving portion and opens toward the rear end of the shaft receiving portion; and
the retaining ridge of the piston engages with the engagement notch of the nozzle cover.

Accordingly, positioning between the nozzle cover and the piston in the rotational direction when attaching the nozzle cover to the distal end of the piston is easily made with good workability, and the nozzle cover is prevented from rotating with respect to the piston once it is attached to the piston.

Furthermore, in the cleaning device of the present invention, a detachable holder is attached to the piston; and this detachable holder is formed with the engagement shaft portion and engagement tabs. Accordingly, it is possible to avoid a complicated piston shape; and it is also possible to use various different types of holders that then make it possible to use nozzle covers of various shapes and sizes, thus increasing the versatility of the piston and nozzle cover.

BRIEF DESCRIPTION OF THE SEVERAL VIEWS OF THE DRAWINGS

Hereinafter, a best mode for carrying out the cleaning device for a vehicular lamp of the present invention will be described with reference to the accompanying drawings.

Figure 1:
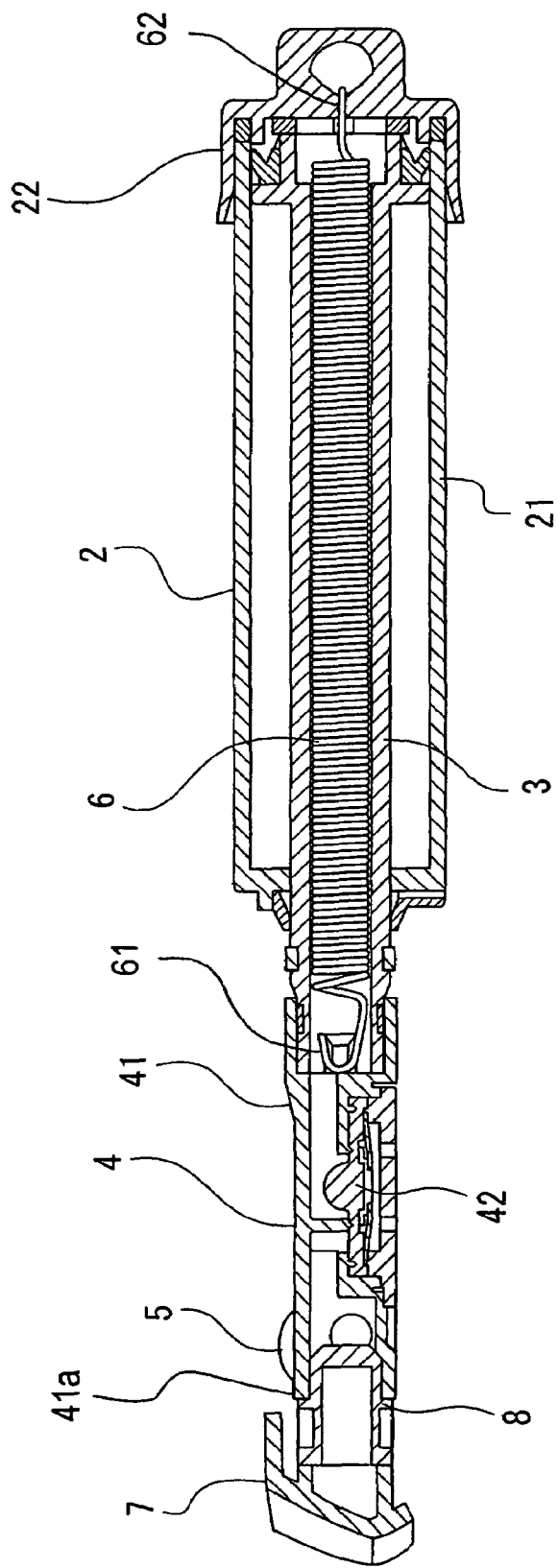
FIG. 1 shows in vertically cross-section one embodiment of the cleaning device for a vehicular lamp according to the present invention.

FIG. 1 is a vertical cross-sectional view of the cleaning device 1 for a vehicular lamp.

The cleaning device 1 for a vehicular lamp has a cylinder 2, a piston 3 slidably connected to the cylinder 2, and a spray nozzle 5 connected to the distal end of the piston 3 with a check valve portion 4 in between.

The cylinder 2 includes a cylinder main portion 21, which is substantially cylindrical, and a joint portion 22, which closes the rear end of the cylinder main portion 21.

The piston 3 is slidably engaged with the cylinder 2. The piston 3 is formed in a substantially cylindrical shape.

An extension coil spring 6 is disposed in the internal portion of the piston 3. Hooks 61 and 62 are formed at the front and rear of the extension coil spring 6, and they are respectively held by the front end portion of the piston 3 and the rear end portion of the cylinder 2. Accordingly, the piston 3 is biased toward a direction that retracts the piston 3 into the cylinder 2.

A check valve portion 4 is connected to the front end portion of the piston 3. Disposed in the check valve body 41 of the check valve portion 4 is a check valve 42. In addition, the check valve body 41 has nozzle supporting portions 43 (see FIG. 2), and spray nozzles 5 are provided on the check valve body 41.

Reference numeral 7 denotes a nozzle cover provided at the front end of the check valve portion 4 via a holder 8.

The cleaning device 1 for a vehicular lamp described above is fixed to a vehicle body via a bracket or the like (not shown).

In the cleaning device 1 for a vehicular lamp described above, cleaning fluid (water) is supplied to the rear end internal portion of the cylinder 2 via a cleaning fluid (water) supply duct (not shown) provided in the joint portion 22 of the cylinder 2. When supplied, the cleaning fluid passes through the internal portion of the piston 3 and fills up to the check valve 42. The pressure of the cleaning fluid extends the extension coil spring 6 such that the piston 3 extends out from (or is driven out of) the cylinder 2. When the pressure of the cleaning fluid in front of the check valve 42 exceeds the durable pressure of the check valve 42, the check valve 42 opens. Cleaning fluid as a result reaches the spray nozzles 5 and is sprayed from nozzle holes 51 (see FIGS. 2 and 3) of the spray nozzles 5.

When the supply of the cleaning fluid to the inside of the cylinder 2 is stopped, the fluid pressure acting on the check valve 42 decreases. As a result, the check valve 42 closes, and the piston 3 is retracted (or is driven back) into the cylinder 2 due to the pulling force of the extension coil spring 6.

Figure 4:
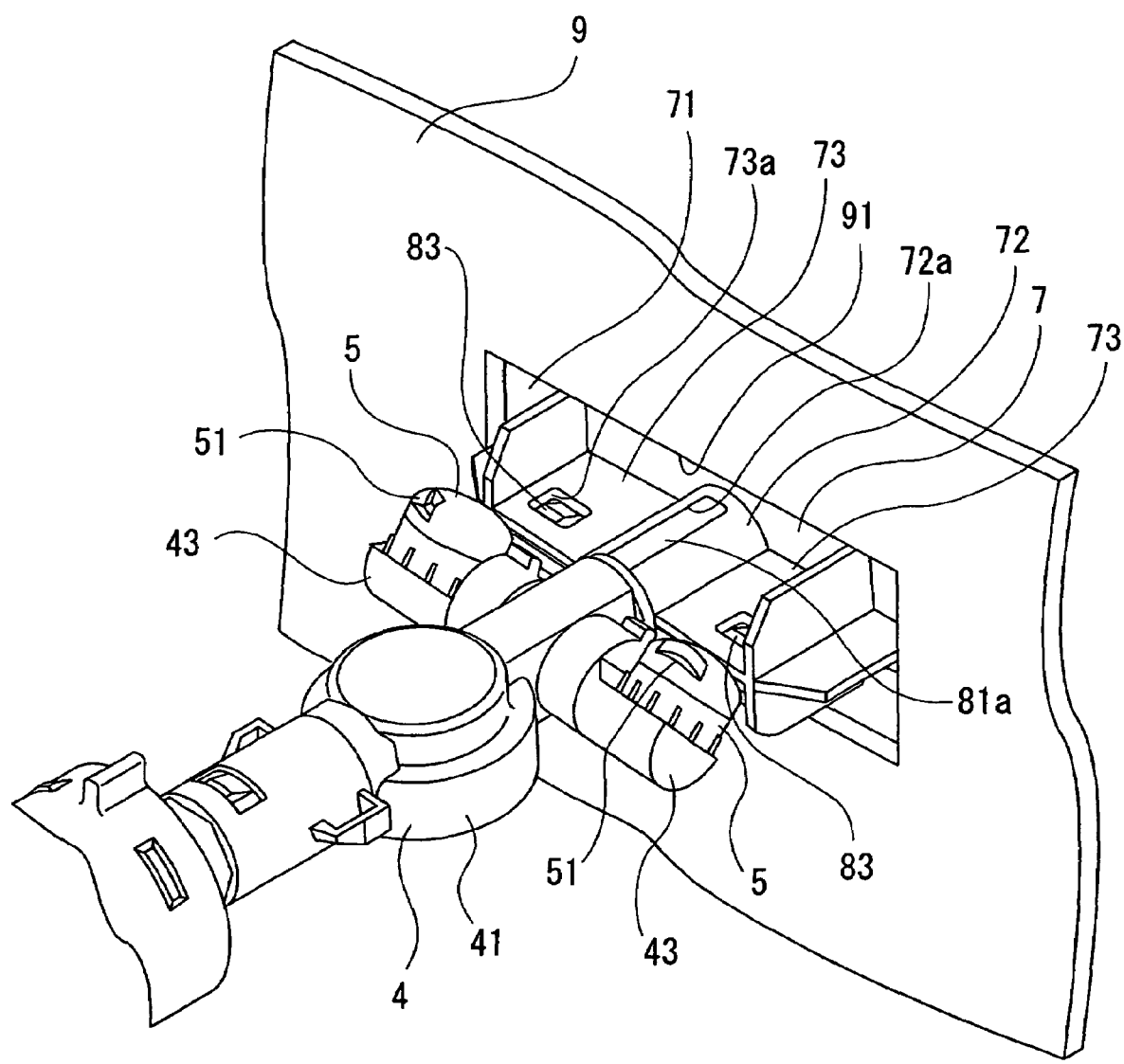
FIG. 4 is a perspective view showing the state in which an opening made in a vehicle body is closed by the nozzle cover as viewed from the inside of the opening.

The nozzle cover 7 has a cover body 71 that covers an opening 91 (see FIG. 4) formed on a part of a vehicle body or of a lamp body, such as a bumper of a vehicle body or a front lens 9 of a lamp body, from the outer side.

Figure 2:
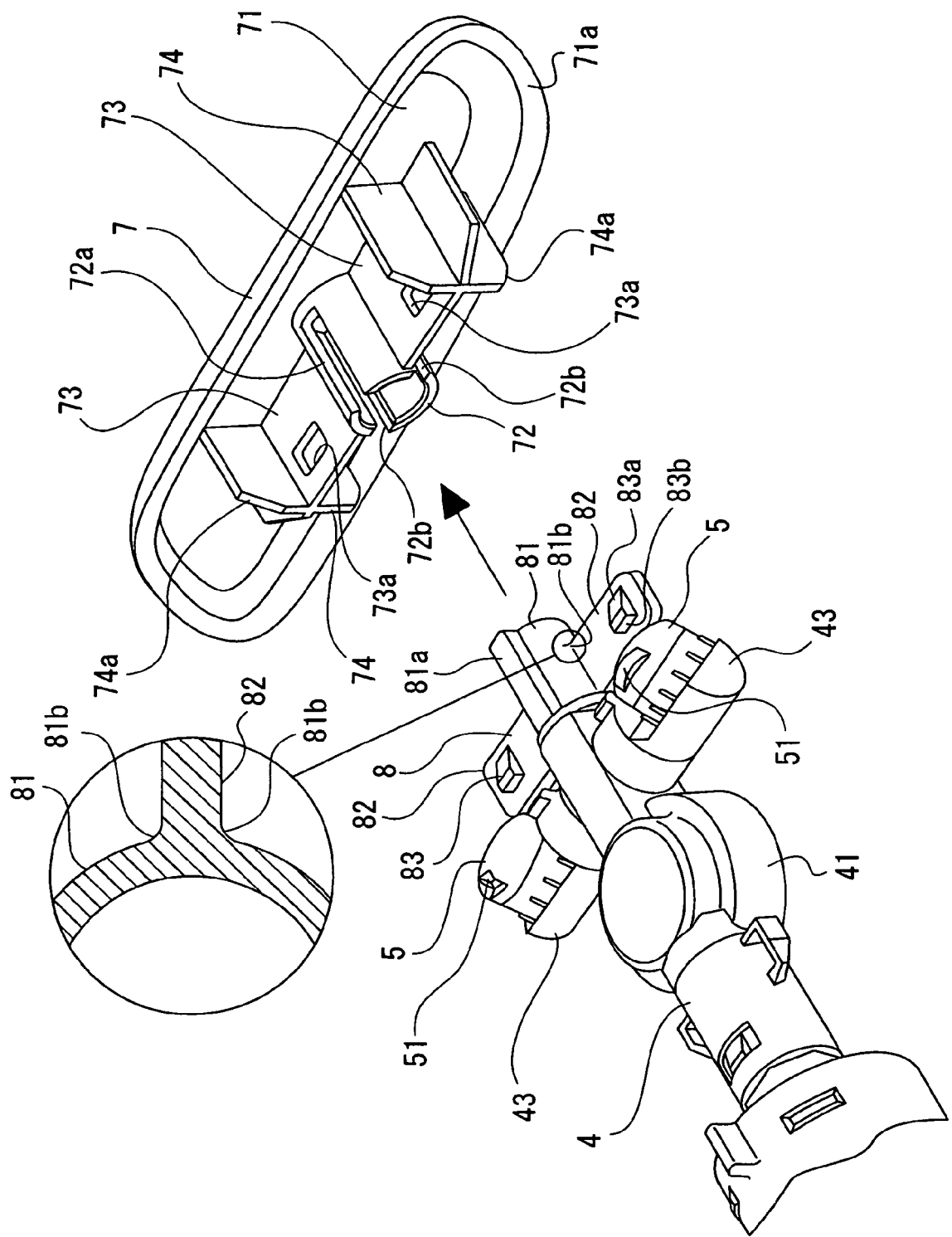
FIG. 2 is a perspective view showing the state in which the nozzle cover is separated from the piston.
Figure 3:
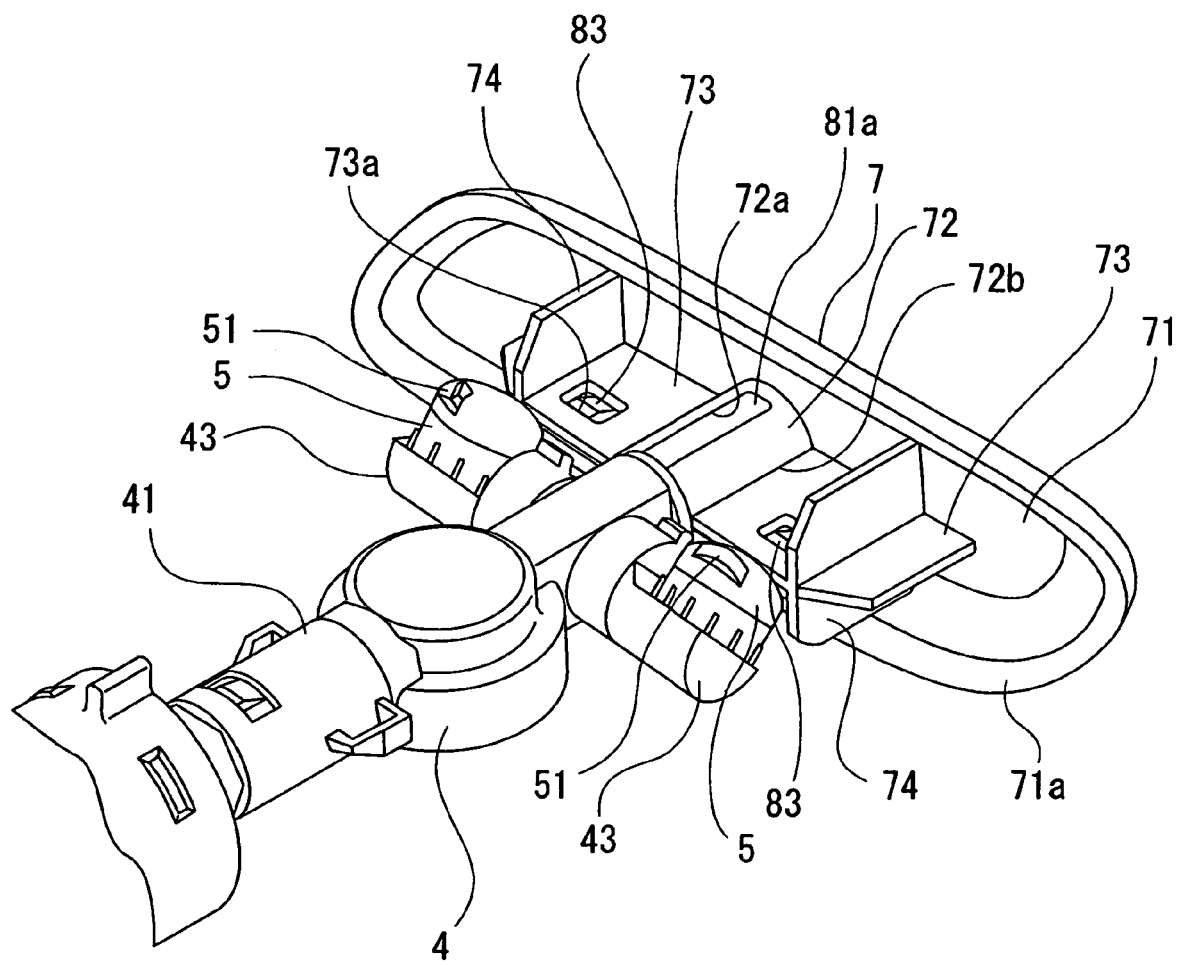
FIG. 3 is a perspective view showing the state in which the nozzle cover attached to the piston.

As best seen from FIGS. 2 and 3, substantially cylindrical shaft receiving portion 72 projects rearward from the center of the rear surface of the cover body 71. The cover body 71 is substantially formed in a horizontally oblong shape, and its both ends in the lengthwise (lateral) direction are rounded. Also, a contact edge 71a that projects rearward is formed on the peripheral edge of the cover portion 71. The contact edge 71a is in contact with the front surface of the opening edge portion of the opening 91. The upper portion of the shaft receiving portion 72 is formed with an engagement notch 72a that extends in the axial direction of the shaft receiving portion 72, and it opens toward the rear end of the shaft receiving portion 72. Furthermore, the shaft receiving portion 72 is formed with receiving notches 72b on its both sides, and the receiving notches 72b extend in the axial direction of the shaft receiving portion 72 and open toward the rear end of the shaft receiving portion 72.

Engagement plate portions 73 are formed on the shaft receiving portion 72 of the cover portion 71 so that they extend sideward from the positions immediately above the receiving notches 72b on both sides of the shaft receiving portion 72. The plane direction of the engagement plate portions 73 is set to face along the axial direction of the shaft receiving portion 72, and the front end edges thereof are formed continuous with the rear surface of the cover body 71. The engagement plate portions 73 have engagement holes 73a.

The cover body 71 is further formed on its rear surface with plate-shaped reinforcement ribs 74. The reinforcement ribs 74 extend rearward from the positions that correspond to the vicinity of the end portions of the engagement plate portions 73. The plane direction of the reinforcement ribs 74 is set to be along the axial direction of the shaft receiving portion 72 and faces perpendicular to the plane direction of the engagement plate portions 73. In addition, the reinforcement ribs 74 are formed continuous with the vicinity of the end portions of the engagement plate portions 73. Inclined edges 74a are formed on both upper and lower corners of the rear end portions of the reinforcement ribs 74.

The distal end 41a of the check valve body 41 of the check valve portion 4 has a cylindrical shape that opens forward, and an engagement hole (not shown) is formed on its side surface portion.

The holder 8 has an engagement shaft portion 81 of an axial shape, and a retaining ridge 81a that extends in the axial direction of the engagement shaft portion 81 is formed on the upper surface of the engagement shaft portion 81.

Plate-shaped supporting portions 82 extend sideward from both sides of the engagement shaft portion 81. Areas between the engagement shaft portion 81 and the supporting portions 82 are formed continuous by gently concave-curved surfaces 81b (see the enlarged cross-sectional view taken from FIG. 2). The plane direction of supporting portions 82 is set to face along the axial direction of the engagement shaft portion 81, and engagement tabs 83 are formed so as to project from the upper surfaces of the supporting portions 82.

The front surfaces of the engagement tabs 83 that face the nozzle cover 7 are formed as inclined surfaces 83a, and the projection height gradually increases in the rearward direction. The rear end surfaces of the engagement tabs 83 are formed so as to act as engagement surfaces 83b, and they are substantially perpendicular to the axial direction of the engagement shaft portion 81.

The engagement shaft portion 81 of the holder 8 has a connecting shaft (not shown) that projects rearward from the rear end of the engagement shaft portion 81. This connecting shaft internally fits with the front end portion 41a of the check valve body 41 of the check valve portion 4, and an engagement tab that extends sideward from the connecting shaft engages with an engagement hole formed on the front end portion 41a of the check valve body 41. The holder 8 is thus attached to the front end portion of the check valve portion 4.

With the above structures, the nozzle cover 7 is attached to the distal end of the piston 3 as described below.

With the cylinder 2 fixed to a vehicle body via a bracket (not shown), the nozzle cover 7 that includes the shaft receiving portion 72 and the engagement plate portions 73 is inserted inside the opening 91 from the outside of the front lens 9 of the lamp or the bumper. As a result, the engagement shaft portion 81 of the holder 8 is relatively brought into the shaft receiving portion 72 of the nozzle cover 7.

When the engagement shaft portion 81 of the holder 8 thus enters the shaft receiving portion 72 of the nozzle cover 7, the retaining ridge 81a of the engagement shaft portion 81 on the piston engages with the engagement notch 72a of the shaft receiving portion 72 of the nozzle cover 7, and base areas of the supporting portions 82 that are near the engagement shaft portion 81 are received by the receiving notches 72b of the shaft receiving portion 72 of the nozzle cover 7. In addition, the inclined surfaces 83a of the engagement tabs 83 that project from the upper surface of the supporting portions 82 relatively press upward the lower side of the rear end edges of the engagement plate portions 73 of the nozzle cover 7. As a result, the engagement plate portions 73 of the nozzle cover 7 and/or the supporting portions 82 on the piston 3 are deflected so as to curve slightly, whereby the engagement tabs 83 are moved underneath the engagement plate portions 73.

When the joining shaft 81 on the piston 3 is completely fitted inside the shaft receiving portion 72 of the nozzle cover 7, the engagement tabs 83 are inside the engagement holes 73a and the engagement surfaces 83b of the engagement tabs 83 on the piston 3 engage with the rear edges of the engagement holes 73a of the nozzle cover 7. As a result, the nozzle cover 7 is attached to the distal end of the piston 3 via the holder 8.

When the nozzle cover 7 is to be removed from the piston 3 for the purpose of, for example, repairs, a jig is inserted between the engagement plate portions 73 of the nozzle cover 7 and the supporting portions 82 of the holder 8 on the piston 3, and then the jig is operated to bend the engagement plate portions 73 and/or the supporting portions 82, thus allowing the engagement between the engagement tabs 83 on the piston 3 and the engagement holes 73a of the nozzle cover 71 be released. The nozzle cover 7 can thus be removed from the holder 8 easily.

In the above-described removing process, the reaction force that is generated when the supporting portions 82 of the holder 8 is bent is diffused by the concave-curved surfaces 81b on the continuously-formed curved areas between the supporting portions 82 and the engagement shaft portion 81 of the holder 8. Accordingly, it is unlikely that the curved areas (the concave-curved surfaces 81b) between the supporting portions 82 and the engagement shaft portion 81 are damaged.

As seen from the above, according to the cleaning device 1 for a vehicular lamp of the present invention, the nozzle cover 7 is firmly attached to the distal end of the piston 3 by way of simply moving the nozzle cover 7 toward the piston 3, while aligning the shaft receiving portion 72 of the nozzle cover 7 and the engagement shaft portion 81 on the piston 3.

In the above description, the nozzle cover 7 is attached to the distal end of the check valve 4 via a detachably attached holder 8. However, the phrase "attached to the distal end of the piston" means "(the nozzle cover 7 is) directly or indirectly attached to the piston."

In addition, the reinforcement ribs 74 formed on the nozzle cover 7 have a function for suppressing the deflection of the engagement plate portions 73 of the nozzle cover 7. However, for the purpose of positioning of the nozzle cover 7 with respect to the opening 91, it can be designed so that the side edges of the reinforcement ribs 74 are brought into contact with the inner surface of the front end portion of the bracket that is attached to the cylinder 2 and positioned with respect to the opening 91.

The shapes and structures of the respective portions in the above embodiments are all but mere examples for carrying out the present invention and must not be construed to limit the technical scope of the present invention in any manner.

What is claimed is:

1. A cleaning device for a vehicular lamp comprising:
   a piston provided at a distal end thereof with a spray nozzle that sprays a cleaning fluid and a nozzle cover that forwardly covers the spray nozzle, and
   a cylinder that drives the piston to extend and retract with respect to an opening formed in a vehicle body; wherein:
      said nozzle cover has a shaft receiving portion with a substantially cylindrical shape that extends from a rear surface of said nozzle cover and an engagement hole which is provided at a position away from the shaft receiving portion;
      said piston has at a distal end thereof an engagement shaft portion that projects forward and is to fit with the shaft receiving portion of said nozzle cover and an engagement tab that is to engage with the engagement hole of said nozzle cover;
      by moving said nozzle cover toward the distal end of said piston, the engagement shaft portion of said piston is brought to fit with the shaft receiving portion of said nozzle cover and the engagement tab of said piston is brought to engage with the engagement hole of said nozzle cover, so that the nozzle cover is attached to the distal end of the piston;
      said nozzle cover has two engagement plate portions that extend in a direction substantially opposite from the shaft receiving portion of said nozzle cover, wherein
         the engagement plate portions are formed in a plate shape,
         a plane direction of the engagement plate portions substantially faces along an axial direction of said piston, and
         the engagement plate portions are formed with said engagement holes; and
      said piston has two supporting portions that extend in a direction substantially opposite from the engagement shaft portion of said piston, wherein
         the supporting portions are formed in a plate shape,
         a plane direction of the engagement plate portions substantially faces along the plane direction of the engagement plate portions of said nozzle cover, and
         the supporting portions are respectively provided with said engagement tabs that project from surfaces that face the engagement plate portions of said nozzle cover, the engagement tab having:
            an inclined surface that faces said nozzle cover and whose projection height gradually increases in a direction away from said nozzle cover, and
            an engagement surface that is a surface opposite from the inclined surface and is substantially perpendicular with respect to an axial direction of said piston.

2. The cleaning device for a vehicular lamp according to claim 1, wherein
   in said piston, the engagement shaft portion and the supporting portions are formed continuously by gently concave-curved surfaces.

3. The cleaning device for a vehicular lamp according to claim 1, wherein
   said nozzle cover is provided with reinforcement ribs that are of a plate shape and extend from a rear surface of said nozzle cover and;
   end portions of the engage ment plate portions that project out of the shaft recieving portion of the nozzle coverare connected to the reinforcement ribs.

4. A cleaning device for a vehicular lamp comprising:
   a piston provided at a distal end thereof with a spray nozzle that sprays a cleaning fluid and a nozzle cover that forwardly covers the spray nozzle, and
   a cylinder that drives the piston to extend and retract with respect to an opening formed in a vehicle body; wherein:
      said nozzle cover has a shaft receiving nortion with a substantially cylindrical shape that extends from a rear surface of said nozzle cover and an engagement hole which is provided at a position away from the shaft receiving portion;
      said piston has at a distal end thereof an engagement shaft vortion that projects forward and is to fit with the shaft receiving portion of said nozzle cover and an engagement tab that is to engage with the engagement hole of said nozzle cover;

by moving said nozzle cover toward the distal end of said piston, the engagement shaft portion, of said piston is brought to fit with the shaft receiving portion of said nozzle cover and the engagement tab of said piston is brouaht to eneaze with the engagement hole of said nozzle cover, so that the nozzle cover is attached to the distal end of the piston;

the engagement shaft portion of said piston is provided on an outer peripheral surface thereof with a retaining ridge that extends in an axial direction of the engagement shaft portion;

the shaft receiving portion of said nozzle cover is formed with an engagement notch that extends in an axial direction of the shaft receiving portion and opens toward a rear end of the shaft receiving portion; and the retaining ridge of said piston engages with the engagement notch of said nozzle cover.

5. The cleaning device for a vehicular lamp according to claim 1, wherein said piston is provided with a detachable holder that is formed with the engagement shaft portion and the engagement tab.

6. The cleaning device for a vehicular lamp according to claim 3, wherein the engagement shaft portion of said piston is provided on an outer peripheral surface thereof with a retaining ridge that extends in an axial direction of the engagement shaft portion;

the shaft receiving portion of said nozzle cover is formed with an engagement notch that extends in an axial direction of the shaft receiving portion and opens toward a rear end of the shaft receiving portion; and the retaining ridge of said piston engages with the engagement notch of said nozzle cover.

* * * * *